(12) United States Patent
Chong

(10) Patent No.: US 10,484,044 B1
(45) Date of Patent: Nov. 19, 2019

(54) DIFFERENTIAL TERMINATION MODULATION FOR BACK-CHANNEL COMMUNICATION

(71) Applicant: Euhan Chong, Ottawa (CA)

(72) Inventor: Euhan Chong, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/968,421

(22) Filed: May 1, 2018

(51) Int. Cl.
*H04B 3/18* (2006.01)
*H04L 1/20* (2006.01)

(52) U.S. Cl.
CPC .............. *H04B 3/18* (2013.01); *H04L 1/208* (2013.01)

(58) Field of Classification Search
CPC ....................................................... H04L 1/208
See application file for complete search history.

(56) References Cited

U.S. PATENT DOCUMENTS

| 2006/0290377 | A1* | 12/2006 | Kim ..................... G06F 13/4072 326/30 |
| 2009/0304054 | A1* | 12/2009 | Tonietto .................. H04L 1/205 375/221 |
| 2011/0038286 | A1 | 2/2011 | Ta et al. |
| 2011/0228864 | A1 | 9/2011 | Aryanfar et al. |
| 2012/0300801 | A1 | 11/2012 | McLeod et al. |
| 2015/0256364 | A1 | 9/2015 | Mobin et al. |
| 2018/0048494 | A1 | 2/2018 | Mobin et al. |

OTHER PUBLICATIONS

A. Ho et al., "Common-mode Backchannel Signaling System for Differential High-speed Links", IEEE Symposium on VLSI Circuits, Digest of Technical Papers, Jun. 2004.
D. Tonietto et al., "Frequency/Phase-Shift-Keying for Back-Channel Serdes Communication" U.S. Appl. No. 15/656,938, filed Jul. 21, 2017.

* cited by examiner

*Primary Examiner* — Kabir A Timory

(57) ABSTRACT

Devices and methods for communicating back-channel data over a communication link are provided. The termination impedance of the communication link at the receiver and/or transmitter side may be modulated to encode back-channel data as signal reflections in the communication link. The corresponding device at the other end of the communication link may detect these reflections and decode them to recover the back-channel data.

15 Claims, 6 Drawing Sheets

DIFFERENTIAL TERMINATION MODULATION FOR BACK-CHANNEL COMMUNICATION

FIELD

The present disclosure relates to a method and apparatus for the transmission of data over a low bandwidth link from a received towards a transmitter. In particular, the present disclosure relates to devices and methods for enabling a backchannel communication link between a receiver and the corresponding transmitter on a point to point serial transmission link.

BACKGROUND

Serial data links are used for communication between a transmitter and a receiver. Systems using serial data links often include serializer-deserializers (SerDes, or SERDES), which consist of a pair of functional blocks, one at each of the transmitter and receiver, that are used for high-speed communication between two nodes, such as two application-specific integrated circuits (ASICs), across a limited input/output link between the two nodes.

Some nodes will include at least one transmitter and at least one receiver, thereby allowing bidirectional communication, although some such communication systems will use only transmitters on the first node and only receivers on the second node. In any case, serial data links are traditionally designed with standalone transmitter (TX) and receiver (RX) sides.

For a serial data link to operate most efficiently, it is desirable for the TX and RX ends of the link to be able to share performance-related information. However, most systems do not have an inherent ability to communicate this information between the transmitter and receiver or vice-versa. Serial data links communicate high-speed data from node to node (e.g. ASIC to ASIC), but are not able to add overhead data to live bit streams, so the performance-related information cannot be encoded in the data stream. Therefore, it is not possible to communicate performance-related information over a serial data link when the data link is active.

One known solution to this problem is to use dedicated circuitry, pins and physical wire connections to create a dedicated physical backchannel for communication of performance-related information or other metadata from the receiver back towards the transmitter of the serial connection. However, this is a large, undesirable overhead because the number of pins available is tightly constrained. A block diagram of an example implementation of such a physical backchannel is shown in FIG. 1. A serial transmission system makes use of a SerDes 100. The SerDes 100 is a Serializer 106 at the transmitter, and a DeSerializer 108 at the receiver. The Serializer 106 and Deserializer 108 form a portion of each of a first application-specific integrated circuit (ASIC) 102 and a second ASIC 104 respectively. The SerDes 100 can be implemented a transmitter macro 106 and a receiver macro 108. Those skilled in the art will appreciate that in an ASIC, the term macro may refer to a somewhat predefined physical design providing a set of functions, the macro design can be used in the implementation of any of the number of different ASIC designs. A data channel 110 allows the transmitter 106 to transmit data to the receiver 108. Physical backchannels 112 are created using physical hardware, such as pins and wires of a data connection. These backchannels 112 may be unidirectional or bidirectional, depending on the physical hardware set aside for them.

The data link may also be used to communicate performance information or other metadata, but not during operation. Existing standards and implementations use existing channels to pass data between chips at startup time as part of a hand-shaking procedure. This hand-shaking usually consists of two parts: auto negotiation (AN) and link training (LT). Auto negotiation is used mainly to configure both sides (TX and RX) to use the same standard, duplex mode and data rate. Link training is used mainly to configure TX amplitudes and equalizer settings. This communication typically happens at lower speed and requires that high speed pseudo-random bit sequence (PRBS) be transmitted periodically so that clock and data recovery (CDR) remains phase-locked.

Because this all occurs only at start up, it cannot respond to any changes in conditions during operation. Link parameters must therefore be set pessimistically, which hurts efficiency. This also affects the speed at which links can be turned on, which further hurts efficiency.

Some techniques have been developed to embed analog back-channel communication on existing data lines.

For example, changing the common mode level of the differential TX or RX circuits may allow some metadata to be embedded in the data signal while the link is operational. One such technique is disclosed by A. Ho, et al., "Common-Mode Backchannel Signaling System for Differential High-Speed Links", IEEE Symp. VLSI Circuits, June 2004.

However, it is difficult for this kind of modulation technique to have no impact on the signal integrity of the data, especially at very high data rates. It also requires a differential (two-wire) electrical physical link—it is not suitable for optical links or single-ended (one-wire) electrical links.

Another similar modulation technique is disclosed by P. Ta, et al., "Using Frequency Divisional Multiplexing for a high-Speed Serializer/Deserializer with Back Channel Communication", U.S. Patent Application Number 20110038386, Published Feb. 17, 2011. SerDes links are sometimes alternating current (AC) coupled—where they are, the low-frequency part of the spectrum may be used for back-channel communication.

FIG. 2 shows an example implementation of such a technique from that publication. A circuit 300 is shown having a first SerDes 302 and second SerDes 304. The first SerDes 302 has a forward channel driver 306 as well as a receiver 308 for reverse channel communication; the second SerDes 304 has a reverse channel driver 310 and a receiver 312 for forward channel communication. Two AC coupling capacitors 314,315 enable the circuit to utilize frequency division multiplexing, which enables bi-directional transmission across a communications medium 316. The forward channel passes relatively high frequency signals output by the forward channel driver 306 through a first AC coupling capacitor 314, which are transmitted through the communications medium 316 and passed through a second AC coupling capacitor 315 to be received by the forward channel receiver 312. On the reverse channel 318, the reverse channel driver 310 passes relatively low frequency signals, which bypass the second AC coupling capacitor 315 through DC coupling, are transmitted through the communications medium 316, bypass the first AC coupling capacitor 314, and are received by the reverse channel receiver 308 through DC coupling.

However, this technique is not applicable to links that are not AC coupled. It requires additional pins and external capacitors in order to set the low-frequency cutoff correctly.

It also adds complexity to the analog data path, which may introduce noise or other non-idealities. As with the common mode modulation technique disclosed by Ho et al., it requires an electrical physical link and so is not suitable for optical links.

SUMMARY

The present disclosure describes example devices and methods to communicate information between compatible devices, such as a SerDes transmitter and a SerDes receiver, using signal reflection in a communication link, without interfering with the payload data or increasing the number of pins or physical wire connections required between the devices (such as TX and RX SerDes macros). This can be used as a side-channel or back-channel to communicate metadata, information about the channel or signal quality, etc. Specific embodiments are described that require minimal additional power consumption, die area, and cost compared with existing common SerDes architectures.

According to some aspects, the present disclosure describes a receiver for receiving a data signal over a communication link and sending back-channel data over the communication link. The receiver comprises a first resistive element having an adjustable first resistance; a second resistive element having a second resistance; a terminator for differentially terminating the communication link using the first resistive element and the second resistive element; and a back-channel data encoder. The adjustable first resistance of the first resistive element is adjusted based on a received first resistor tuning signal. The back-channel data encoder receives a back-channel data signal and provides a first resistor tuning signal to the first resistive element based on the back-channel data signal.

According to a further aspect, the disclosure describes a transmitter for transmitting a data signal over a communication link and detecting back-channel data sent over the communication link. The transmitter comprises a terminator for differentially terminating the communication link; a detector for detecting signal reflections in the communication link; and a back-channel data decoder for decoding back-channel data from the signal reflections detected by the detector.

According to a further aspect, the disclosure describes a receiver for receiving a signal from a transmitter over a pair of transmission lines and for transmitting back channel information towards a transmitter. The receiver has a back channel encoding controller for generating a control signal in accordance with data intended for transmission to the transmitter. The receiver also has a differential terminator connected to the pair of transmission lines for providing a termination to each of the transmission lines, the termination of each of the transmission lines being differentially applied in accordance with the control signal generated by the back channel encoding controller.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
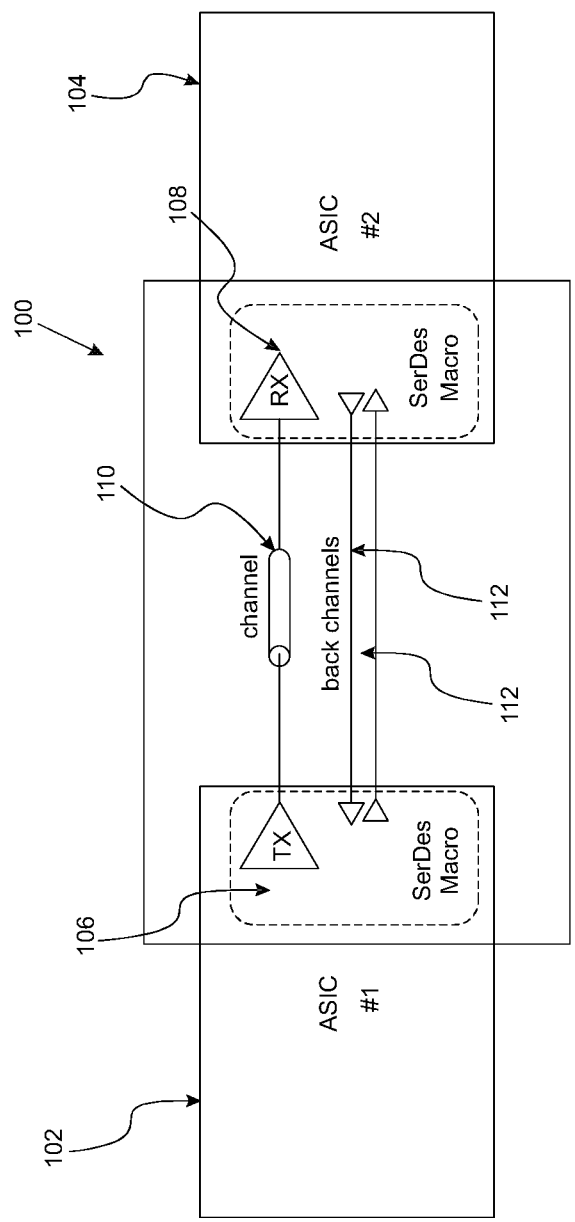
FIG. 1 is a block diagram showing a known example implementation of backchannels created between the transmitter and receiver portions of a SerDes using dedicated physical hardware.
Figure 2:
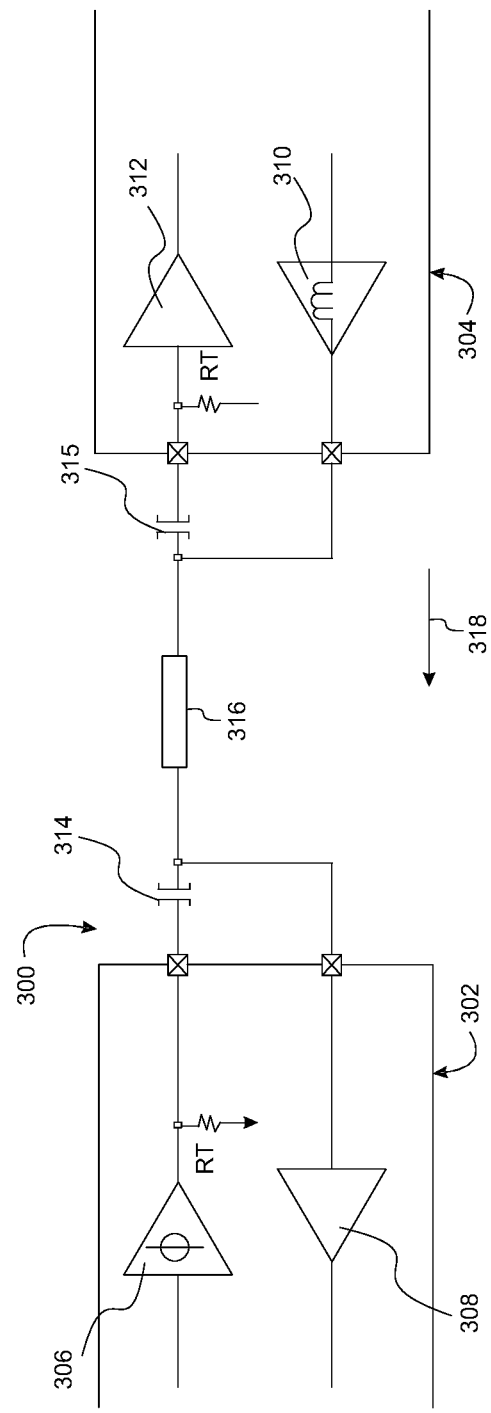
FIG. 2 is a known example implementation of a system for creating a backchannel between an AC-coupled SerDes transmitter and receiver portions by using the low-frequency part of the spectrum for back-channel communication, as described in "Using Frequency Divisional Multiplexing for a high-Speed Serializer/Deserializer with Back Channel Communication", U.S. Patent Application Number 20110038286, Published Feb. 17, 2011.
Figure 3:
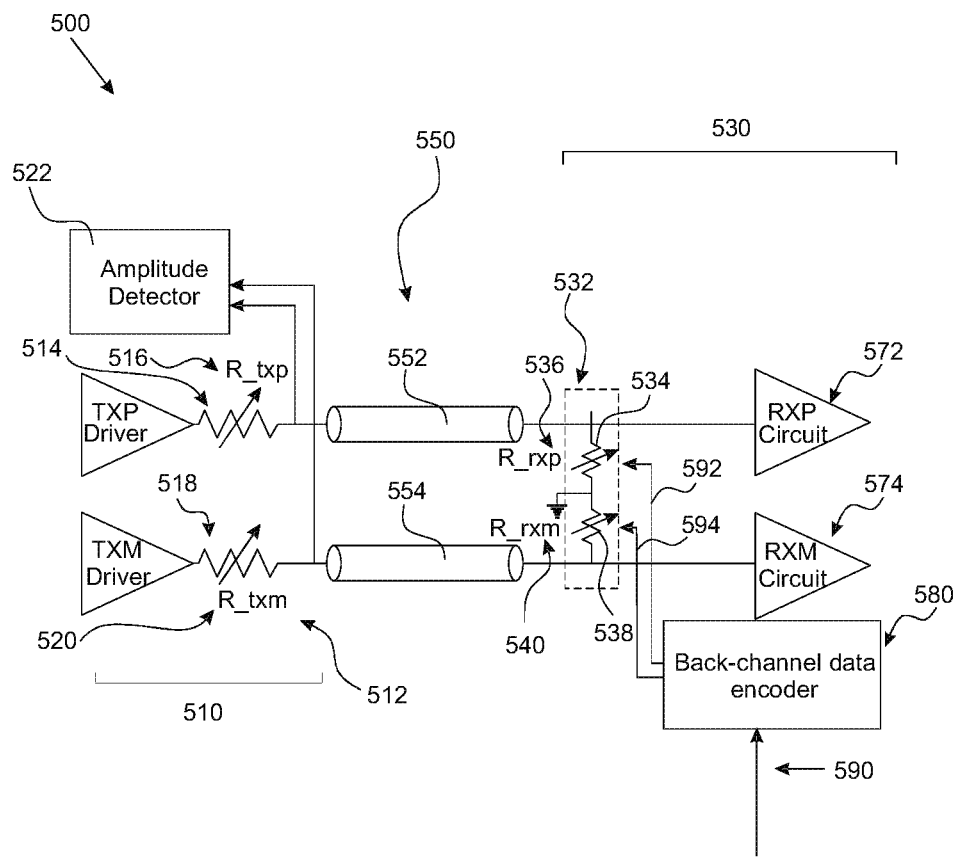
FIG. 3 is a block diagram of a first example embodiment showing a receiver configured to use tunable differential termination of a communication link to communicate back-channel data to a transmitter over the communication link.

The present disclosure describes example devices and methods that enable a device to create signal reflections in a communication link to create a backchannel. By varying the termination impedance or resistance of the communication link, the device creates signal reflections in the communication link that can be detected and decoded by the device on the other end of the link. The termination impedance is modulated to encode backchannel data the sending device intends to communicate via the backchannel. The sending device may be either a receiver or a transmitter with respect to the main data channel flowing over the communication link.

In many implementations, a single physical link will be dedicated to transmitting data in a single direction. This simplifies communications as a second dedicated link can be used for transmitting data in the opposite direction without increasing the signalling overhead associated with the bi-directional communications. This may be particularly useful in situations involving transmission of real time data over relatively short connections One issue that may arise is the need for a control channel over which the receiver can transmit information, such as control channel data, to the transmitter. As discussed above, this so-called back-channel information has conventionally been transmitted either in a separate channel (increasing the complexity of implementing transmitters and receivers) or through allocating some of the physical channel resource to the back channel (which reduces the capacity of the channel).

In the embodiments discussed below, a mechanism for transmitting data from a receiver towards the transmitter will be disclosed. In a receiver, a differential signal can be received over a pair of wires. These physical channels are typically logically paired, and the received signal is decoded as a function of a comparison of the voltage received on each wire. For such a system to work, each of the wires has to be terminated at the receiver, which is typically achieved through the use of a resistive (or inductive in some embodiments) element between the wire and electrical ground. The exact resistance used is often a function of characteristics of the operating environment. To accommodate such variation, each wire is often terminated with a variable resistance that can be adjusted to select the desired termination resistance.

Improper selection of the resistance typically creates an undesirable voltage across the transmission wire that reduces the effective bandwidth of the transmission channel. This voltage is both detectable at the transmitter (especially in comparison with the paired wire) and controllable through the variable terminator resistance.

These, typically undesirable, effects of varying the terminating resistance are, as noted above, detectable at the transmitter. Embodiments of the present invention take advantage of the detectability, at the transmitter, of variation in the termination at the receiver to create a back channel. By varying the termination characteristics of the transmission lines, a voltage change can be detected at the transmitter. This effect may be more detectable when the termination characteristics of the transmission lines are varied with respect to each other, which may include varying the termination characteristics of one of the two lines. Those skilled in the art will appreciate that in some embodiments, the termination of a line is provided by at least one of a resistance or an inductance. In such cases, the termination characteristic being varied may be the terminating resistance or the terminating inductance.

It should be understood that varying the termination characteristics greatly or quickly may have adverse effects on the bandwidth of the transmission line, or the quality of the received signal. However, it is possible to control the magnitude of the change to a relatively small variance, which results in a voltage differential across the transmission lines that can be detected at the transmitter. These relatively small variances will have a limited effect on the quality of the transmission lines, and this only needs to happen when there is information to be provided to the transmitter. This allows any effect of the bandwidth or channel quality reduction to be limited to the times at which the backchannel is used for transmission. Furthermore, in many implementations the change in the properties of the transmission channel may be detectable, but still within an a priori defined range of acceptability.

Phrased another way, the signal reflections may allow a receiver (Rx) to talk to a transmitter (Tx) through the same physical Tx-to-Rx channel. This would avoid requiring a dedicated back-channel or a separate return (Rx-to-Tx) channel for the RX chip to send data to the TX chip. It would also enable each physical channel in a multi-channel communication system to have its own back-channel. Because each back-channel would be paired to its own dedicated channel, they could operate independently and in parallel with each other.

The back-channel data can be sent from the Rx to the Tx by encoding it in a signal that is generated by skewing the differential termination impedance of the communication link, i.e. by skewing the termination applied to the RxP wire (by a "plus" or "positive" polarity termination resistor) and the RxM wire (by a "minus" polarity termination resistor, also referred to as RxN or "negative" polarity). This would in turn result in a difference in the corresponding signal amplitudes of the TxP wire and TxM wire measured at the Tx side of the communication channel. A low frequency amplitude or peak detector could be used to detect this change in TxP and TxM amplitude.

Figure 5:
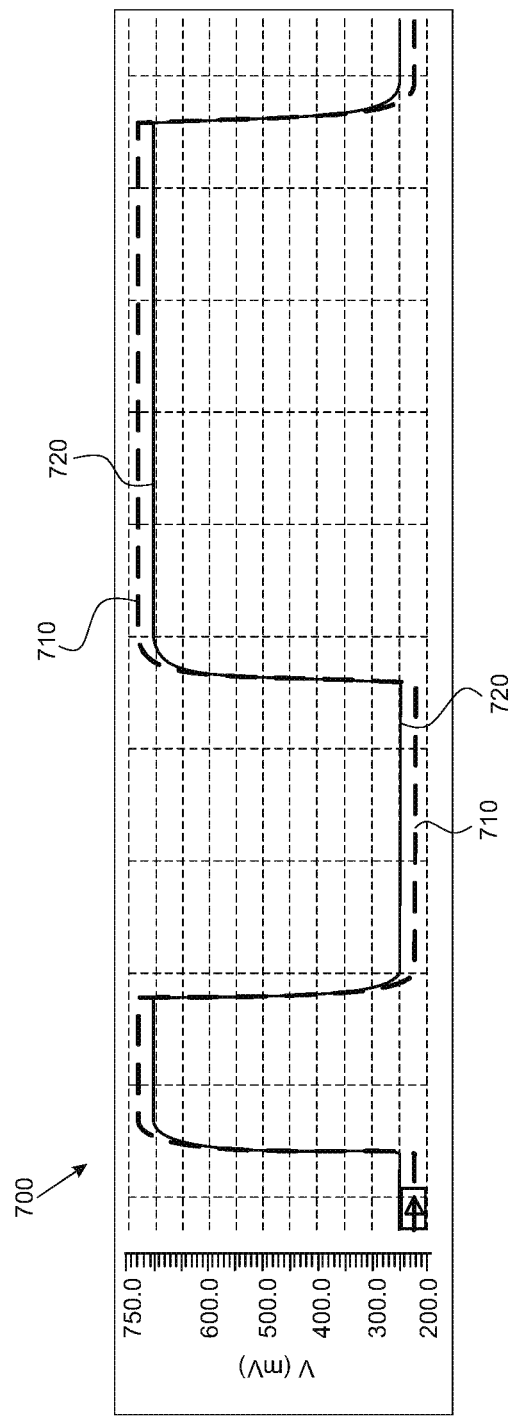
FIG. 5 is a voltage amplitude plot of a first data signal and a second data signal sent over a second conductor according to a simulation of an example embodiment.
Figure 6:
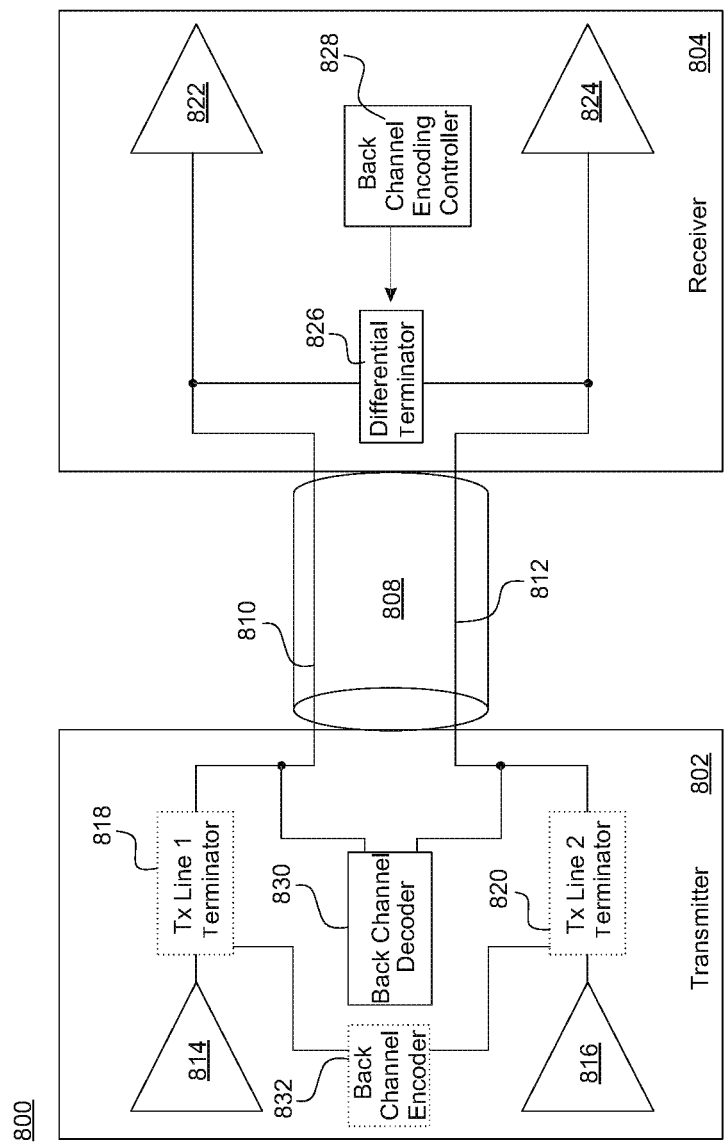
FIG. 6 is a block diagram of an example communication system using differential termination of communication lines to create a back channel between a transmitter and a receiver.

With reference to FIG. 5, a communication system 500 is shown encompassing a transmitter 510 and a receiver 530 in communication via a differential communication link 550. The communication link 550 comprises a first conductor 552 and a second conductor 554 for carrying a differential data signal; in this illustrated embodiment, the first conductor 552 is framed as a positive lead (txp to rxp), and the second conductor 554 is framed as a positive lead (txm to rxm or txn to rxn), but this polarity could be reversed without affecting functionality.

The receiver 530 includes a terminator 532 for differentially terminating the communication using a first resistive element 534 having an adjustable first resistance R_rxp 536 and a second resistive element 538 having an adjustable second resistance R_rxm 540. Those skilled in the art will appreciate that an adjustable resistance may also be referred to as a variable resistance. The first resistance R_rxp 536 is adjusted by a received first resistor tuning signal 592, and the second resistance R_rxm 540 is adjusted by a received second resistor tuning signal 594. The signal carried by the first conductor 552 is received at the receiver, and is terminated by a connection to a ground 542 via the first resistive element 534, and to a first receiver circuit 572. The signal from the second conductor 554 is connected to the ground 542 via the second resistive element 534, and to a second receiver circuit 574.

The receiver 530 transmits back-channel data 590 to the transmitter 510 by encoding the back-channel data 590 as signal reflections in the communication link 550. The receiver 530 includes a back-channel data encoder 580 that receives back-channel data 590 and controls a differential termination of the paired communication links. This differential termination can be effected by generating at least one of the first resistor tuning signal 592 and the second resistor tuning signal 594. By adjusting or tuning the first resistance R_rxp 536 and the second resistance R_rxm 540, the impedance of the terminator 532 is adjusted over time based on the back-channel data 590. The back-channel data encoder 580 thus encodes the back-channel data 590 as signal reflections in the communication link 550, as the change in termination impedance over time creates varying signal reflections over time.

In the illustrated example, the transmitter 510 also has a transmitter terminator 512 comprising a transmitter first resistive element 514 having an adjustable transmitter first resistance T_rxp 516 and a transmitter second resistive element 518 having an adjustable second resistance T_rxm 520. The transmitter terminator 512 differentially terminates the communication link 550 on the transmitter side. This may allow the TX to use the same reflection-based back-channel communication technique to communicate with the Rx during link operation, enabling bidirectional back-channel communication. However, a system may also implement uni-directional back-channel communication from the RX to the TX side without the use of adjustable resistive elements on the TX side. In a uni-directional application, resistive elements 514 and 518 may have fixed resistance instead of adjustable resistance.

The transmitter decodes the back-channel data 592 from the communication link 550 by means of an amplitude detector 522 in communication with the first conductor 552 and second conductor 554. The amplitude detector 522 can detect the changes in receiver-side termination impedance over time due to the changes in signal reflection present in the communication link 550.

Some embodiments implement each of the resistive elements 514,518,534,538 as a plurality of resistors connected in parallel or termination slices. Switches may be used to activate or deactivate each of these parallel resistors or slices to increase or decrease the overall resistance provided by the resistive element.

The encoding or modulation scheme for the back-channel data is, in some embodiments, designed to minimize disruption of the data signal from the transmitter 510. The signal reflections created through modulation of termination impedance are small in amplitude and slow in frequency to avoid significant degradation of signal-to-noise ratio (SNR) in the data signal. Disruption of data signal integrity (SI) can also be minimized by only sending information over the back-channel for a short time during mission mode (i.e. when the data signal is being actively transmitted by the transmitter 510 over the communication link 550).

By using low-frequency, low-amplitude changes in termination impedance at the receiver 530, noise can be minimized on the communication link. No common-mode noise is introduced over the communication link, and the back-channel does not introduce any differential offset, so the signal slicing point at the receiver 530 is not affected.

A first example encoding scheme uses the relative resistance values of R_rxp 536 and R_rxm 540 to encode bits of back-channel data 590. When R_rxp 536 is set to be greater than R_rxm 540 during a predetermined back-channel time unit interval (thereby creating a detectable decrease in TXP amplitude relative to RXP amplitude at the transmitter 510), this encodes a "1" bit value. When R_rxp 536 is set to be less than R_rxm 540 during a predetermined back-channel time unit interval, this encodes a "0" bit value (thereby creating a detectable increase in TXP amplitude relative to RXP amplitude at the transmitter 510). When R_rxp 536 is set to be equal to R_rxm 540 during a predetermined back-channel time unit interval, this encodes no data.

The adjustment of R_rxp 536 and R_rxm 540 may be accomplished by adjusting one value, or both. The value or values may be adjusted upward or downward, by the same amount or by different amounts. For example, an embodiment may maintain both R_rxp 536 and R_rxm 540 at fifty ohms (50Ω) as a baseline resistance encoding no data. To encode a "1" bit value in the back-channel, R_rxp 536 may be adjusted to fifty-five ohms (55Ω) and R_rxm 540 may be adjusted to forty-five ohms (45Ω). A "0" bit value may be encoded by adjusting R_rxp 536 to forty-five ohms (45Ω) and R_rxm 540 to fifty-five ohms (55Ω).

In some embodiments, the transmitter 510 terminates the communication link 550 using resistors having adjustable resistance, such as transmitter first resistive element 514 having an adjustable transmitter first resistance R_txp 516 and a transmitter second resistive element 518 having an adjustable second resistance R_txm 520. In such embodiments, the transmitter-side resistive elements 514,518 may adjust their respective resistances 516,520 in inversely proportional response to a detected change in the receiver-side resistances. Thus, in one such example embodiment, when the transmitter-side amplitude detector 522 detects an increase in amplitude TXP of the signal being transmitted over the first conductor 552, corresponding to a decrease in the value of resistance R_rxp 536, the transmitter 510 responds by effecting a corresponding increase in resistance R_txp 520. This negative feedback system would maintain a constant amplitude of each of the two signals being sent over the conductors 552,554, thereby minimizing any effect of back-channel reflections on data signal integrity.

In some examples, the impedance changes are small relative to a baseline resistance or impedance level. For example, a baseline impedance of the receiver-side terminator may be 50Ω in one embodiment. If R_rxp 536 is skewed to 60Ω and R_rxm to 40Ω, the transmitter differential amplitude may be kept constant at about ~1V. The peak to peak amplitude of TXP would be ~100 mV larger than TXM. However, in example embodiments, such a large impedance change may not be necessary. A change in R_rxp and R_rxm of 5Ω each may be sufficient in a system with a 50Ω baseline.

The amplitude detector 522 may in example embodiments be an amplitude or peak detector to compare the difference in single-ended amplitudes between TXP and TXM at the TX side. Because the data is low frequency in some examples, this detector can be small and low power.

Creation of a bi-directional backchannel is possible in some embodiments. Where the transmitter-side impedance (R_txp 516 and R_txm 520) is adjustable, low frequency data can be transmitted from the transmitter 510 to the receiver 530 by skewing the transmitter drive resistances R_txp 516 and R_txm 520. This bi-directional back-channel communication can in some examples enable hand-shaking or auto negotiation for each communication link. In some examples, this may enable a single communication link to coordinate bi-directional link training, adaptation, or both without relying on any other communication link between the receiver 530 and the transmitter 510.

In some embodiments with such bi-directional back-channel communication, the transmitter 510 and receiver 530 would establish separate time windows for receiver-side back-channel use and transmitter-side back-channel use to avoid back-channel data collision. In other embodiments, some other form of sequential turn-taking is established between the receiver 530 and transmitter 510 for the same purpose.

Some devices or systems already use receivers and/or transmitters with adjustable termination impedance, including termination impedance using multiple parallel termination slices. Implementing the described examples in the context of such systems or devices could potentially be very simple to implement, and would potentially have zero impact on termination loading or bandwidth.

Figure 4:
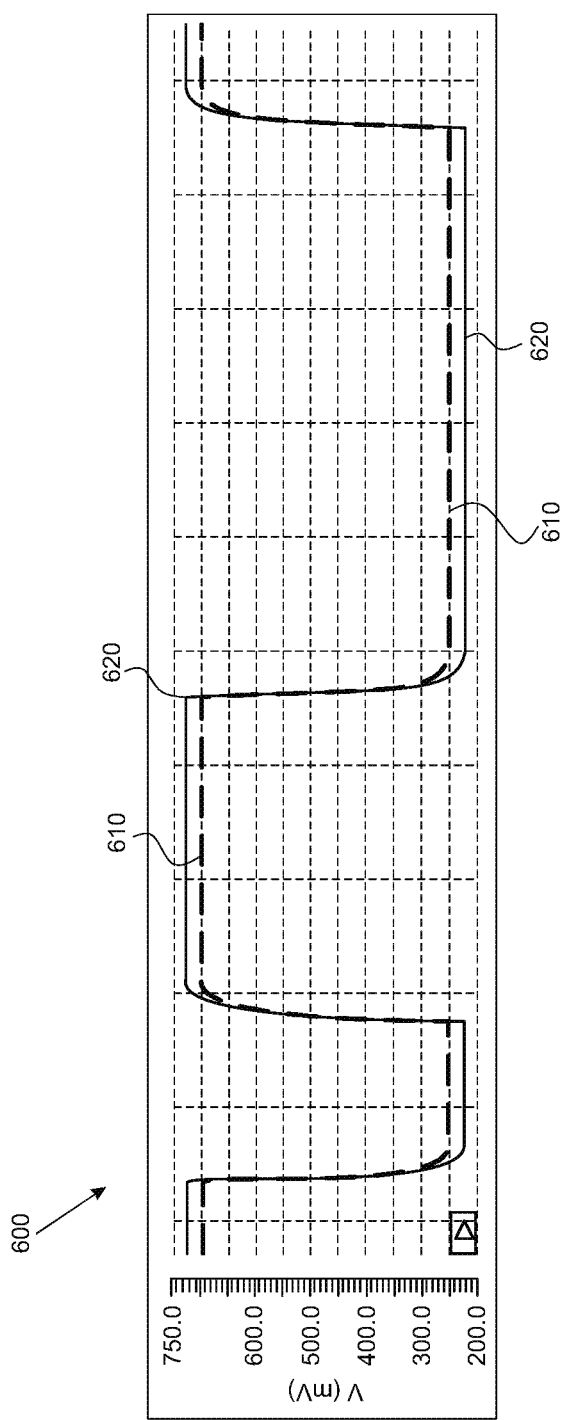
FIG. 4 is a voltage amplitude plot of a first data signal and a second data signal sent over a first conductor according to a simulation of an example embodiment.

FIGS. 4 and 5 show simulation results of example SerDes implementations of the described techniques. FIG. 4 is a voltage plot of two positive-polarity data signals sent by the transmitter 510 over the first conductor 552: a first output signal amplitude 610 and a second output signal amplitude 620, measured in response to two different adjustments of the receiver impedance. The first output signal amplitude 610 is in response to an adjustment of R_rxp 536 to 45Ω from a baseline of 50Ω, and an adjustment of R_rxm 540 to 55Ω from a baseline of 50Ω. The second output signal amplitude 620 is in response to an adjustment of R_rxp 536 to 55Ω from a baseline of 50Ω, and an adjustment of R_rxm 540 to 45Ω from a baseline of 50 Ω.

Similarly, FIG. 5 shows a voltage plot of two negative-polarity data signals sent by the transmitter 510 over the second conductor 554: a first output signal 710 and a second output signal 720, measured in response to two different adjustments of the receiver impedance. The first output signal 710 is in response to an adjustment of R_rxp 536 to 45Ω from a baseline of 50Ω, and an adjustment of R_rxm 540 to 55Ω from a baseline of 50Ω. The second output signal 720 is in response to an adjustment of R_rxp 536 to 55Ω from a baseline of 50Ω, and an adjustment of R_rxm 540 to 45Ω from a baseline of 50 Ω.

The first output signals 610,710 can therefore be considered to represent a data signal being sent during transmission from the receiver 530 to the transmitter 510 of a first bit value of back-channel data, such as "1". The second output signals 620,720 can correspondingly be considered to represent a data signal being sent during transmission from the receiver 530 to the transmitter 510 of a second bit value of back-channel data, such as "0". These simulation results show that the data signal is minimally perturbed by the transmission of back-channel data via differential termination impedance in an example system where in the baseline impedance is 50Ω and the resistance 536,540 of each resistor 534,538 is changed by only 5Ω to encode a bit of back-channel data 590.

FIG. 8 is an illustration of a communication system 800 that uses differential termination of communication (or transmission) lines to create a back channel between a transmitter 802 and a receiver 804.

Transmitter 802 and receiver 804 are connected by a communications link 808. In the illustrated embodiment, communications link 808 has a pair of transmission lines 810 and 812. In one embodiment, the paired transmission lines 810 and 812 are used to carry a differentially encoded signal. Transmitter 802 has a pair of transmitting amplifiers 814 and 816, the outputs of which are connected to lines 810 and 812 respectively. In some embodiments the output of the amplifier 814 and amplifier 816 is connected to transmission line 1 terminator 818 and transmission line 2 terminator 820. Signals transmitted over transmission line 810 is received at amplifier 822 in receiver 804, while the signal transmitted over transmission line 812 is received by amplifier 824. As will be understood by those skilled in the art each of the transmission lines 810 and 812 are terminated at the receiver. In many conventional implementations, a variable termination is provided for each of the transmission lines 810 and 812. This allows each line to be terminated in a manner that allows for a maximization of the bandwidth of the channel 808. What the prior art would have considered as an improper termination of transmission lines 810 and 812 will result in a detectable change in a voltage detectable at the transmitter 802. Differential terminator 826 controls the termination of the transmission lines in accordance with a control signal associated with data intended for transmission over the back channel provided by back channel encoding controller 828. Differential terminator 826 can, based on the received control signal, can set the termination for each of the transmission lines 810 and 812 to different values. In some embodiments, an intentional skewing of the termination is applied, while in other embodiments one of the two transmission line terminations is modified. This creates a detectable change in voltage at the transmitter 802, and if a differential termination is applied, this may be manifested by a detectable difference in the voltage between the lines 810 and 812. Back channel decoder 830, in transmitter 802, detects changes in the voltage characteristics on transmission lines 810 and 812. A change in the amplitude of voltage carried on each of the lines 810 and 812, and in some embodiments the change in the amplitude of the voltage of line 810 with respect to the voltage of line 812 can be detected. This change in the detected voltage carries the back channel signal, which can be decoded and acted upon by transmitter 802.

In some embodiments, transmitter 802 includes the back channel encoder 832 illustrated as optional. This allows the control of the termination applied by terminators 818 and 820. The control of termination at the transmitter can allow the transmitter 802 to create a detectable voltage change across lines 810 and 812 that can be received by a back channel decoder (not illustrated) at receiver 804. This optional embodiment allows for control information to be encoded in voltage changes by each side of the channel.

In some embodiments, the back-channel data comprises link performance information which is available only at the receiver side, but can be used by the transmitter side, e.g. for link training and/or adaptation of a transmitter-side continuous time linear equalizer (CTLE).

Some embodiments may adjust the resistance of only one resistor of a differential pair. For example, a receiver configured to send back-channel data may encode the back-channel data by varying the first resistance of the first resistive element 534 without adjusting the resistance of the second resistive element 538. This may sacrifice some of the signal stabilizing effects of adjusting the resistances in opposing directions but may simplify implementation.

Various aspects of the above-described embodiments could be recombined to form additional example embodiments.

Some embodiments may require a particular hardware configuration in TX and/or RX macros of the SerDes, whereas others may be implemented purely as firmware or other software.

Various embodiments may be applied to applications operating according to various short- or long-haul communication standards, including Optical Internetworking Forum (OIF) standards, IEEE 10GBASE-KR, IEEE 25GBASE-KR, and other known SerDes communication standards.

The communication link 550 may in some embodiments be an electrical link, such as a twisted-pair cable or a backplane system bus.

Various embodiments would be usable with various types of physical electrical communication links.

In some embodiments, the SerDes may use conventional auto-negotiation (AN) and link training (LT) techniques at startup, in order to comply with existing standards, and then make use of one of the described techniques in the background, for dynamic adaptation while the data link is operational.

Some embodiments may apply the described techniques outside of the context of SerDes. Any receivers and transmitters communicating across an electrical link can potentially apply the described techniques for creating a back-channel within the communication link by modulating termination impedance at the receiver and/or transmitter side, thereby creating time-varying signal reflections within the link.

Some embodiments may be compatible with the use of other back-channel communication techniques, such as common-mode modulation, as long as the limitations of such techniques as described in the Background section are taken into account.

Although the present disclosure describes methods and processes with steps in a certain order, one or more steps of the methods and processes may be omitted or altered as appropriate. One or more steps may take place in an order other than that in which they are described, as appropriate.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A receiver for receiving a data signal over a communication link and sending back-channel data over the communication link, comprising:
    a first resistive element having an adjustable first resistance, the first resistance being adjusted based on a received first resistor tuning signal;
    a second resistive element having a second resistance;
    a terminator for differentially terminating the communication link using the first resistive element and the second resistive element; and
    a back-channel data encoder for:
       receiving a back-channel data signal; and
       providing a first resistor tuning signal to the first resistive element based on the back-channel data signal.

2. The receiver of claim 1 wherein:
    the second resistance is adjustable and is adjusted based on a received second resistor tuning signal; and
    the back-channel data encoder is further configured to provide a second resistor tuning signal to the second resistive element based on the back-channel data signal.

3. The receiver of claim 2 wherein, to encode a bit of the back-channel data, the back-channel data encoder provides:
    a first resistor tuning signal that causes the first resistance to change in either a positive or negative direction; and
    a second resistor tuning signal that causes the second resistance to change in the same direction as the first resistance.

4. The receiver of claim 3 wherein the change in the first resistance is equal to the change in the second resistance.

5. The receiver of claim 3 wherein the change in the first resistance is different from the change in the second resistance.

6. The receiver of claim 2 wherein, to encode a bit of the back-channel data, the back-channel data encoder provides:
    a first resistor tuning signal that causes the first resistance to change in either a positive or negative direction; and
    a second resistor tuning signal that causes the second resistance to change in the opposite direction from the first resistance.

7. The receiver of claim 6 wherein the absolute value of the change in the first resistance is equal to the absolute value of the change in the second resistance.

8. The receiver of claim 7 wherein:
    the first resistance has a first baseline value; and
    the first resistance stays within ten ohms of the first baseline value while being changed by the first resistor tuning signal.

9. The receiver of claim 7 wherein:
    the first resistance has a first baseline value; and
    the absolute value of the difference between the first resistance and the first baseline value stays below twenty percent of the first baseline value while the first resistance is being changed by the first resistor tuning signal.

10. The receiver of claim 9 wherein:
    the second resistance has a second baseline value; and
    the absolute value of the difference between the second resistance and the second baseline value stays below ten percent of the second baseline value while the second resistance is being changed by the second resistor tuning signal.

11. The receiver of claim 2 wherein the first resistive element comprises a plurality of parallel resistor slices, one or more of which are activated or deactivated based on the first resistor tuning signal.

12. The receiver of claim 2 wherein:
    the data signal received over the communication link has a unit interval of time corresponding to a clock cycle; and
    the back-channel data encoder changes the value of the first resistor tuning signal less often than once every ten unit intervals.

13. The receiver of claim 2 wherein the receiver comprises a serializer-deserializer (SerDes) receiver.

14. The receiver of claim 2 wherein the back-channel data encoder comprises:
    a memory containing instructions for encoding the back-channel data as signal reflections in the communication link by providing the first resistor tuning signal and the second resistor tuning signal to modulate the first resistance and second resistance respectively; and
    a processor configured to execute the instructions stored in the memory.

15. The receiver of claim 2 wherein the back-channel data encoder comprises an integrated circuit configured to encode the back-channel data as signal reflections in the communication link by providing the first resistor tuning signal and the second resistor tuning signal to modulate the first resistance and second resistance respectively.

* * * * *